United States Patent
Baba

(10) Patent No.: US 8,397,103 B2
(45) Date of Patent: Mar. 12, 2013

(54) METHOD FOR DETECTING THE IMPROPER REMOVAL OF ELECTRONIC EQUIPMENT

(75) Inventor: Tsutomu Baba, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 338 days.

(21) Appl. No.: 12/989,980

(22) PCT Filed: Apr. 28, 2009

(86) PCT No.: PCT/JP2009/001926
§ 371 (c)(1),
(2), (4) Date: Dec. 15, 2010

(87) PCT Pub. No.: WO2009/133695
PCT Pub. Date: Nov. 5, 2009

(65) Prior Publication Data
US 2011/0107132 A1 May 5, 2011

(30) Foreign Application Priority Data
Apr. 30, 2008 (JP) ................................. 2008-118023

(51) Int. Cl.
*G06F 11/00* (2006.01)
(52) U.S. Cl. ........................................................ 714/24
(58) Field of Classification Search .................... 714/24
See application file for complete search history.

(56) References Cited

U.S. PATENT DOCUMENTS

| | | | | |
|---|---|---|---|---|
| 7,269,748 B2 * | 9/2007 | Shuto et al. | ............... | 713/300 |
| 2003/0126498 A1 * | 7/2003 | Bigbee et al. | ............... | 714/10 |
| 2006/0212636 A1 * | 9/2006 | Yasuo | ............... | 710/303 |
| 2007/0136523 A1 * | 6/2007 | Bonella et al. | ............... | 711/113 |
| 2008/0140967 A1 * | 6/2008 | Breslau et al. | ............... | 711/163 |
| 2009/0132815 A1 * | 5/2009 | Ginter et al. | ............... | 713/164 |
| 2009/0271619 A1 * | 10/2009 | Fujii et al. | ............... | 713/164 |
| 2010/0217912 A1 * | 8/2010 | Rofougaran | ............... | 710/304 |
| 2012/0057394 A1 * | 3/2012 | Norman | ............... | 365/148 |

FOREIGN PATENT DOCUMENTS

| | | |
|---|---|---|
| JP | 10-111836 | 4/1998 |
| JP | 2005-043973 | 2/2005 |
| JP | 2005-148969 | 6/2005 |
| JP | 2006-178640 | 7/2006 |

* cited by examiner

*Primary Examiner* — Scott Baderman
*Assistant Examiner* — Neil Miles
(74) *Attorney, Agent, or Firm* — Frommer Lawrence & Haug LLP

(57) ABSTRACT

A method for detecting an improper removal of the electronic equipment. In the method, having received a command from a higher-level device, the electronic equipment (card reader) executes processing operations in accordance with the command. The electronic equipment includes a first RAM for saving electronic information including the confidential data, a detection means (such as a switching circuit) for detecting the improper removal of the electronic equipment, a power supply control IC for shutting off a power supply to the RAM in accordance with a signal coming from the detection means, and a second RAM being separate from and independent of the first RAM. Data saved in the RAM is not deleted even if the power supply is shut off by the power supply control IC. Then, the detection means is activated after the confidential data saved in the first RAM is copied to the second RAM.

8 Claims, 2 Drawing Sheets

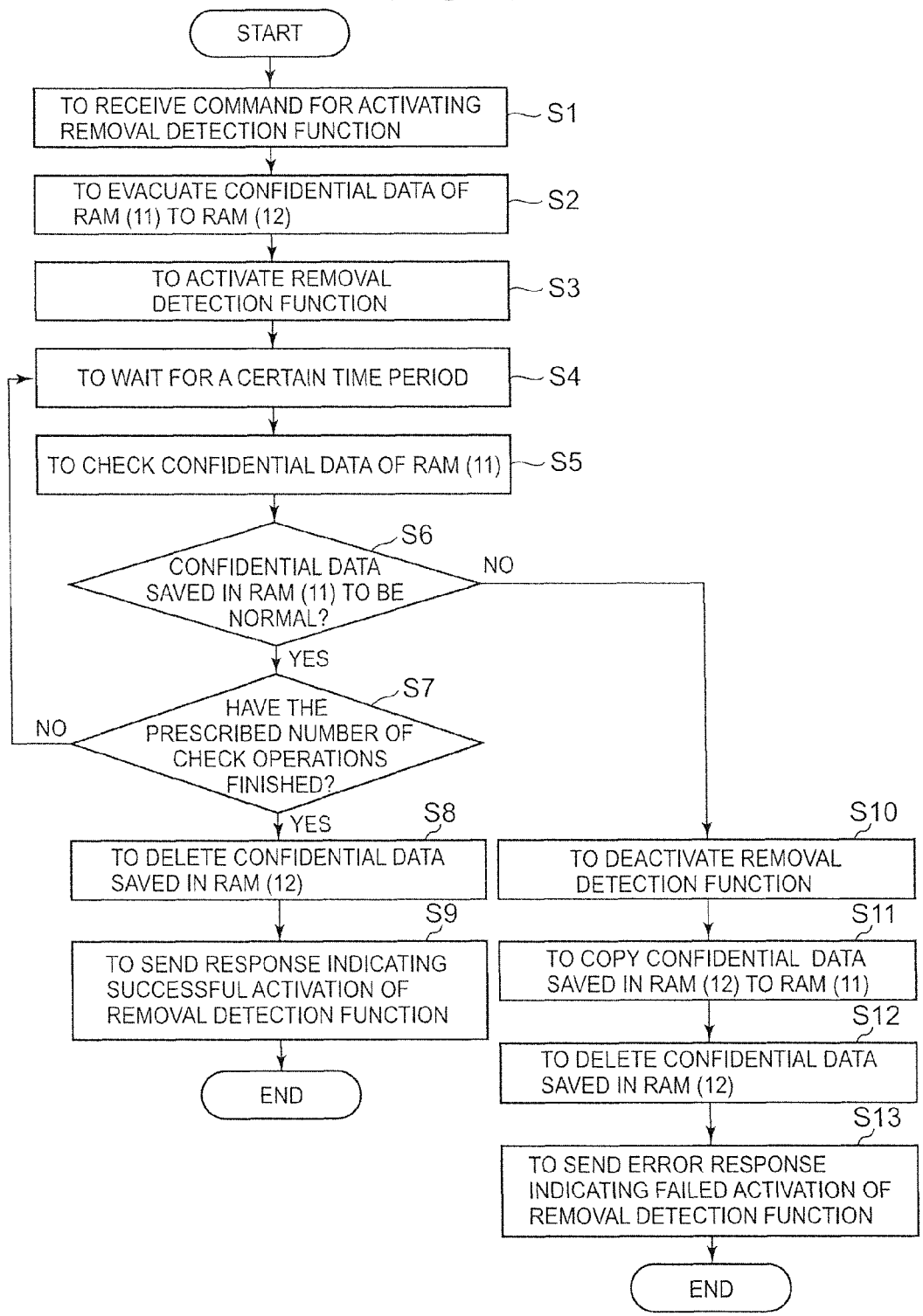

METHOD FOR DETECTING THE IMPROPER REMOVAL OF ELECTRONIC EQUIPMENT

The present application claims priority from PCT Patent Application No. PCT/JP2009/001926 filed on Apr. 28, 2009, which claims priority from Japanese Patent Application Nos. JP 2008-118023 filed on Apr. 30, 2008, the disclosure of which is incorporated herein by reference in its entirety.

BACKGROUND OF THE INVENTION

1. Field of the Invention

The present invention relates to a method for detecting an improper removal of electronic equipment that deals with confidential data.

2. Description of Related Art

In operation of electronic equipment such as a card reader, confidential data (such as key data to be used for encryption operations) is saved in a volatile memory backed up by a secondary power supply. Then, each time when it is required, the confidential data is read out from the volatile memory to a working memory for executing various processes. Since the confidential data is indispensable for execution of those various processes, usually the confidential data is saved in such a way as not to disappear. However, if any error condition such as an improper removal of electronic equipment is detected, the secondary power supply to the volatile memory as well as a power supply from a main power source are shut off, and eventually the confidential data is deleted.

In such an operation environment, the electronic equipment such as a card reader is installed in a cabinet of an operation terminal to be operated by users, for example, a terminal used at a gas station and the like. A maintenance operator, who carries out maintenance and tuning work for such electronic equipment installed at a site of the market, sometimes needs to remove the electronic equipment out of the cabinet of the operation terminal for users. Therefore, a function of deactivating removal detection is generally provided for preventing the confidential data from being deleted unnecessarily. After completion of maintenance and tuning work, the electronic equipment is installed again in the cabinet of the operation terminal for users described above, and then the removal detection function is activated.

For example, in the case of an entering/leaving management system disclosed in Japanese Unexamined Patent Application Publication No. 2005-148969 (JP 2005-148969), when an improper removal of a card reader is detected, a cryptographic key saved in the card reader is deleted. However, taking into consideration the maintenance work performance described above, a higher-level device of the card reader is provided with a maintenance switch. Then, as far as the maintenance switch is turned on, the cryptographic key is not deleted under the arrangement.

The above explanation is focused on deactivation and activation of the removal detection function at the time of maintenance work. However, even in a production stage of electronic equipment before installing the electronic equipment at an installation site of the market, a technique of deactivation and activation of the removal detection function is used for preventing the confidential data from being deleted under conditions where electronic equipment is removed from the cabinet of the operation terminal for users described above.

Unfortunately, the maintenance switch described in JP 2005-148969 may not sometimes have enough operability for maintenance and tuning work and the like. More specifically to describe, if the maintenance operator recklessly activates the removal detection function by mistake under conditions where the electronic equipment is not normally installed in the cabinet of the operation terminal for users described above, the removal of the electronic equipment is instantly detected so that the confidential data is deleted. Such deletion of the confidential data is one of fatal errors, and therefore since then mostly the error disables continuous normal operation. Under the condition, from a viewpoint of security, it is impossible to restore the electronic equipment then and there. As a result, the electronic equipment must be restored to an environment where the security is ensured, and namely it is deemed that the electronic equipment does not have enough operability.

SUMMARY OF THE INVENTION

It is an object of the present invention to provide a method for detecting an improper removal of electronic equipment. The method prevents confidential data from being deleted due to a human error by a maintenance operator and the like, and then improves operability in maintenance and tuning work, and so on.

To achieve the object described above, the present invention provides the following aspects.

(1) A method for detecting an improper removal of electronic equipment, which receives a command from a higher-level device and executes a processing operation according to the command, the electronic equipment including: a first memory for saving electronic information including confidential data; a detection means for detecting an improper removal of the electronic equipment; a power supply control means for shutting off a power supply to the first memory according to a signal from the detection means; and a second memory being separate from and independent of the first memory, while data saved in the second memory being not deleted even when the power supply control means shuts off the power supply; wherein the detection means is activated after the confidential data saved in the first memory is copied to the second memory.

According to this embodiment, the electronic equipment includes: the first memory for saving electronic information including the confidential data; the detection means for detecting an improper removal of the electronic equipment; and the power supply control means for shutting off the power supply to the first memory. The second memory is separate from and independent of the first memory, and data saved in the second memory is not deleted even when the power supply control means shuts off the power supply. In the meantime, the detection means is activated after the confidential data saved in the first memory is copied to the second memory. Therefore, even if the detection means is activated under conditions where the electronic equipment is not normally installed in the cabinet of the operation terminal for users described above, the existence of the confidential data copied in the second memory enables quick restoration of the data by using the copied one. Accordingly, this method can prevent the confidential data from being deleted due to a human error by a maintenance operator and the like, and then improve operability in maintenance and tuning work, and so on.

There is no restriction on the timing 'when the confidential data saved in the first memory is copied (evacuated) in the second memory.' For example, the confidential data may be copied just before activation of a detection function of the detection means (at the timing of, such as, receiving a command from the higher-level device for activation of the detection function of the detection means), or may be copied at the time of turning on the power of the electronic equipment. The latter case means that the confidential data is copied beforehand to the second memory.

Furthermore, there is no restriction on the type of the first memory and the second memory. These memories may be either volatile memory devices such as RAMs, or non-volatile memory devices such as EEPROMs and FROMs. In the latter case, needed separately is a program and the like that actively deletes the confidential data in the non-volatile memory devices.

(2) The method for detecting an improper removal of electronic equipment described above, wherein the confidential data saved in the first memory is copied to the second memory at the time when the electronic equipment receives a command for activating a detection function of the detection means from the higher-level device.

According to this embodiment, the confidential data saved in the first memory is copied to the second memory at the time when the electronic equipment receives a command for activating the detection function of the detection means from the higher-level device, and therefore security of the improper removal detection function can be enhanced. In other words, the confidential data is copied only after the electronic equipment receives a command for activating the detection function of the detection means from the higher-level device, and therefore a time period for redundantly saving the highly important confidential data (in the first memory and the second memory) can be shortened so that security can be enhanced accordingly.

(3) The method for detecting an improper removal of electronic equipment described above, wherein at least one of the first memory and the second memory is a volatile memory device.

According to this embodiment, at least one of the first memory and the second memory is a volatile memory device, and therefore the confidential data saved in the one of the first memory and the second memory or two is automatically deleted when the power supply from the main power source and the secondary power supply is shut off. Accordingly, being compared with a case where a non-volatile memory device is used for the one of the first memory and the second memory or two, this method can shorten the time period in which the confidential data remains in the memory, so that security can be enhanced accordingly.

(4) The method for detecting an improper removal of electronic equipment described above, wherein the method includes: a step of judgment on whether the confidential data saved in the first memory remains normally or not, after the detection means is activated; and a step of operations, according to a result of the step of judgment, in which the detection means is deactivated if the confidential data saved in the first memory does not remain normally, and the confidential data saved in the second memory is deleted if the confidential data saved in the first memory remains normally.

According to this embodiment, it is judged whether the confidential data saved in the first memory remains normally or not, after the detection means is activated. As a result, the detection means is deactivated if the confidential data does not remain normally, and in the meantime, the confidential data saved in the second memory is deleted if the confidential data remains normally. Therefore, even if the detection means is activated under conditions where the electronic equipment is not normally installed in the cabinet of the operation terminal for users so that the confidential data does not remain normally, the confidential data can still be restored from the second memory to the first memory under conditions where the detection means is deactivated, so that operability in maintenance and tuning work, and so on can be improved accordingly. Moreover, since the confidential data saved in the second memory is deleted in the case where the confidential data remains normally, the time period for redundantly saving the confidential data can be shortened, so that security can be enhanced accordingly.

(5) The method for detecting an improper removal of electronic equipment described above, wherein, after the step of the operations is executed, a response in relation with the step of the operations is sent to the higher-level device from the electronic equipment.

According to this embodiment, the response in relation with the step of the operations is sent to the higher-level device from the electronic equipment, after either the detection means is deactivated or the confidential data of the second memory is deleted, as described above. Therefore, the higher-level device can recognize whether or not the improper removal detection function has been activated normally, and then the higher-level device can take an action quickly as required for a subsequent operation (for example, indicating that the electronic equipment is installed imperfectly, on a monitor screen the maintenance operator can view, to prompt the maintenance operator to reinstall the electronic equipment). Incidentally, not only the response is sent, but also warnings may be issued by means of others, such as a flashing LED lamp and a buzzer sound.

In the method for detecting an improper removal of electronic equipment according to the present invention, the detection means is activated under conditions where the confidential data is copied in the second memory being separate from and independent of the first memory. Therefore, even if the detection means is activated under conditions where the electronic equipment is not normally installed in the cabinet of the operation terminal for users, restoration work can be carried out quickly, and operability in maintenance and tuning work and the like can be improved eventually.

BRIEF DESCRIPTION OF THE DRAWINGS

FIG. 2 is a flowchart showing a workflow of the method for detecting an improper removal according to the embodiment of the present invention.

DETAILED DESCRIPTION OF EMBODIMENTS

Figure 1:
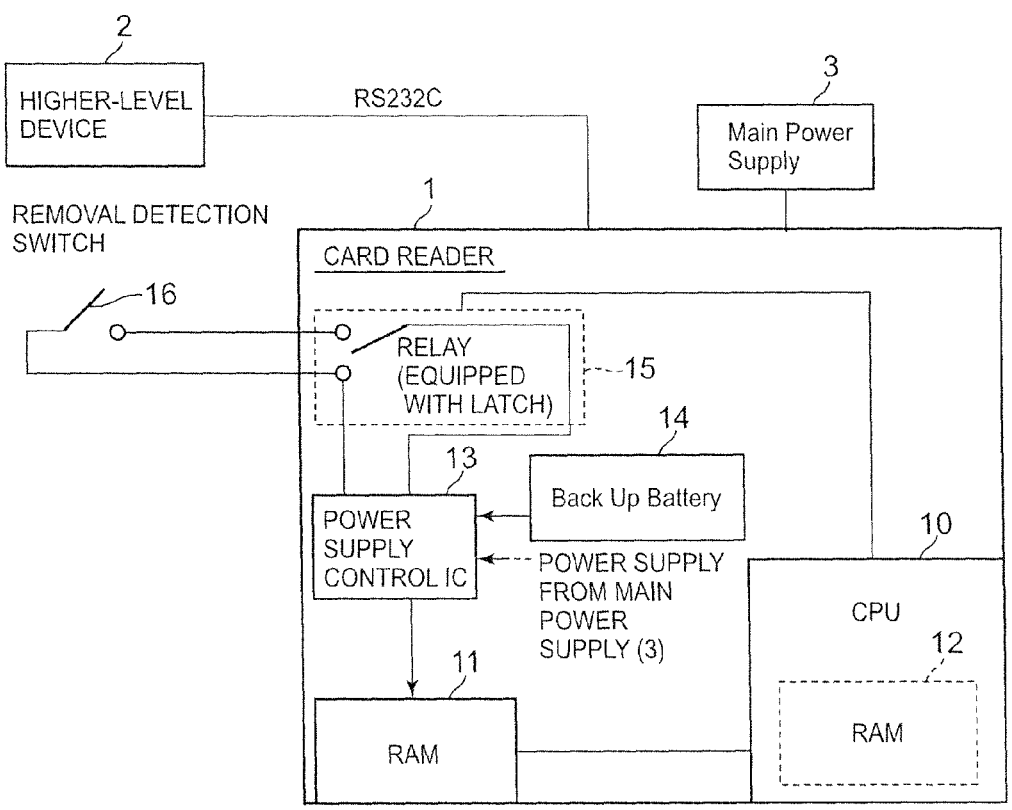
FIG. 1 is a block diagram showing an electrical configuration of a card reader 1 for which the method for detecting an improper removal according to an embodiment of the present invention is applied.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Configuration of Electronic Equipment

FIG. 1 is a block diagram showing an electrical configuration of a card reader 1 for which the method for detecting an improper removal according to an embodiment of the present invention is applied. In this embodiment, the card reader 1 is installed in a cabinet of an operation terminal to be operated by users (e.g., a terminal used at a gas station, an automated teller machine (ATM), and the like). Installed in the cabinet are the card reader 1 and a higher-level device 2. In the present embodiment, the card reader 1 and the higher-level device 2 are electrically connected through RS232C (Needless to describe, any other connection mode can be used instead). Incidentally, the higher-level device 2 may be installed in any other control unit, not being installed in the operation terminal for users. In the present embodiment, the card reader 1 is adopted as an example of 'the electronic equipment.' However, the present invention is not limited to a configuration of the example, and can be applied to any other electronic equipment for which it is necessary to protect confidential data against an improper removal. Furthermore, the present invention can be applied not only to detecting a simple improper removal but also to any other equipment having a function of switching activation/deactivation of removal detection (improper operation detecting function) for maintenance and tuning work and the like (which may be referred to simply as maintenance work, etc.).

The card reader 1 includes: a CPU 10, a RAM 11, another RAM 12 built in the CPU 10, a power supply control IC 13, a backup power supply (battery) 14, a switching circuit 15, and a removal detection switch 16. These constituent components described above are electrically connected with each other at least through a bus and the like shown by using a solid line (or a solid line with an arrow) in the drawing. Incidentally, in the present embodiment, the RAM 12 is built in the CPU 10, but is not limited to the arrangement.

The CPU 10 controls overall operation of the card reader 1. Namely, calling an initializing program and/or a basic program out of another ROM or the like, not shown in FIG. 1, the CPU 10 executes these program(s) to control overall operation of the card reader 1. Furthermore, the CPU 10 receives a command from the higher-level device 2, and executes each processing (such as an application program and the like) according to the command, for example, to activate the switching circuit 15 by a 'Hi' (High) output and/or to deactivate the switching circuit 15 by a 'Lo' (Low) output. Still further, the CPU 10 reads out data saved in the RAM 11 and the RAM 12, and also writes data into those memory devices.

The RAM 11 and the RAM 12 built in the CPU 10 are, for example, volatile memory devices that provide a working space for the CPU 10 to execute a program. Working data required for each operation is saved in the working space. A difference between both the memory devices is explained later in detail.

The power supply control IC 13 supplies the RAM 11 with electric power from a main power supply 3 as well as the secondary power supply 14. The RAM 11 is supplied with electric power from the main power supply 3 under normal conditions, and it is supplied with electric power from the secondary power supply 14 under conditions where the power is turned off. Furthermore, the power supply control IC 13 functions as an example of a 'power supply control means' that shuts off the power supply (electric power supply) to the RAM 11 in accordance with an output signal from the switching circuit 15.

The switching circuit 15 and the removal detection switch 16 function as an example of a 'detection means' that detects an improper removal of the card reader 1. Specifically to describe, the switching circuit 15 includes a relay equipped with a latch, and a switching operation of the switching circuit 15 is controlled by the CPU 10. When the switching circuit 15 (removal detection function) is activated, the relay and the removal detection switch 16 are serially connected. On the other hand, when the switching circuit 15 is deactivated, the relay and the removal detection switch 16 are not serially connected. In other words, formed in the former case is a closed loop through the removal detection switch 16, and in the meantime, formed in the latter case is a closed loop that does not include the removal detection switch 16.

Under conditions where the switching circuit 15 is activated by the CPU 10, if the removal detection switch 16 (such as a lever, a button, and the like (i.e., any mechanical switch)) gets into an open state from a closed state, a conductive state is replaced with a non-conductive state. As a result, sent from the switching circuit 15 to the power supply control IC 13 is a signal indicating that the conductive state has been replaced with the non-conductive state (For example, an electric current with 'Non 0 (zero)' changes to be '0 (zero)', or a circuit resistance value reaches an infinite value). The power supply control IC 13 shuts off the power supply to the RAM 11 in accordance with the signal.

Though the 'detection means' in the present embodiment includes the switching circuit 15 and the removal detection switch 16, any other electrical element may be added. Furthermore, in relation to the removal detection switch 16, the switch may be something optical such as a photo sensor and the like, or something magnetic such as a magnetic sensor and so on, instead of being a mechanical switch. Still further, an EEPROM, a flash memory, and the like may be provided, though they are not shown in FIG. 1. Saved in such memory device may be electronic information (e.g., confidential data, an execution program, an error detection symbol (CRC, check sum, and BCC), and the like).

In this paragraph, a difference between the RAM 11 and the RAM 12 described above is explained in detail. The RAM 11 is a practical example of a 'first memory' that saves electronic information including confidential data. In the meantime, being separate from and independent of the RAM 11, the RAM 12 is a practical example of a 'second memory' in which saved data is not deleted even if the power supply is shut off by the power supply control IC 13. In other words, the RAM 11 is a memory device in which saved data is deleted according to removal detection under conditions where the switching circuit 15 is activated, while the RAM 12 is another memory device in which saved data is not deleted according to the removal detection (The memory device is not directly connected to the switching circuit 15).

In the method for detecting an improper removal according to the present embodiment, the switching circuit 15 gets activated after the confidential data saved in the RAM 11 is copied to the RAM 12. The method for detecting an improper removal is explained below in detail with reference to FIG. 2.

Workflow of the Method for Detecting an Improper Removal

FIG. 2 is a flowchart showing a workflow of the method for detecting an improper removal according to the embodiment of the present invention. In the meantime, on the premise as already described with reference to FIG. 1, the higher-level device 2 (for example, a host computer) and the card reader 1 are electrically connected to each other. Then, receiving a command from the higher-level device 2, the card reader 1 executes processing operation according to the command, and notifies the higher-level device 2 of a result of the processing operation.

In FIG. 2, the higher-level device 2 sends a command for activating the removal detection function to the card reader 1 (Step S1). Taking a cue from this step of receiving the command, the CPU 10 of the card reader 1 evacuates (copies) the confidential data saved in the space (the volatile memory (i.e., RAM 11)), where data is deleted according to improper removal detection, to the other space (the volatile memory (i.e., RAM 12)), where data is not deleted even with improper removal detection (Step S2).

Then, the removal detection function is activated (Step S3). More specifically to describe, the CPU 10 of the card reader 1 activates the switching circuit 15 through changing an output from the CPU 10 and the like (to switch the condition into a state where the relay of the switching circuit 15 makes up a closed loop in the case of a removal being detected).

After having waited for a certain time period (for example, 2 ms) (Step S4), the data of the RAM 11 is checked (Step S5). More specifically to describe, the CPU 10 of the card reader 1 makes a calculation of cyclic redundancy check (CRC) on the data existing in the RAM 11 after elapse of the certain time period. Then, the CPU 10 makes a judgment on whether the confidential data saved in the RAM 11 remains normally or not (Step S6). If the confidential data remains normally (namely, if the card reader 1 is normally installed in the above-mentioned cabinet of the operation terminal for users to operate it) (Step S6: YES), it is then checked whether or not the prescribed number of check operations (operations of checking the data in Step S5) have finished (Step S7). If the prescribed number of check operations have finished (Step S7: YES), the confidential data saved in the RAM 12 is deleted (Step S8) since it is unnecessary. Then, the CPU 10 sends the higher-level device 2 a response indicating successful activation of the removal detection function (Step S9). If the prescribed number of check operations have not yet finished (Step S7: NO), operations of Step S4 through Step S7 are carried out repeatedly.

Though what is checked at Step S7 in FIG. 2 is the 'prescribed number of check operations, a 'prescribed time period' for example may be checked instead. The 'prescribed time period' is a time interval to be specified on the basis of a case where the removal detection function is activated with imperfect installation of the card reader 1 so that the confidential data is immediately deleted. In other words, the 'prescribed time period' may be so set as to identify activation of the removal detection function with imperfect installation of the card reader 1.

On the other hand, if the confidential data does not remain normally (namely, if the card reader 1 is not normally installed in the cabinet of the operation terminal for users) (Step S6: NO), the switching circuit 15 is deactivated according to a command from the CPU 10 (Step S10). Then, the CPU 10 copies the confidential data saved in the RAM 12 (the evacuated data) to the RAM 11 (Step S11), and subsequently deletes the confidential data saved in the RAM 12 (Step S12). In the end, the CPU 10 sends the higher-level device 2 a response indicating failed activation of the removal detection function (Step S13). Thus, there finishes operation of the method for detecting an improper removal according to the present embodiment. Incidentally, after operation of Step S13, the higher-level device 2 may prompt a maintenance operator to retry checking installation condition of the card reader 1 as well as activating the removal detection function, and furthermore a series of operation steps shown in FIG. 2 may be carried out again.

Advantageous Effect of the Embodiment

As described above, in the method for detecting an improper removal according to the present embodiment, the confidential data saved in the RAM 11 is copied to the RAM 12 (Refer to Step S2 in FIG. 2). Therefore, even when the removal detection function is activated under conditions of imperfect installation of the card reader 1 (Step S3 in FIG. 2) by mistake of the maintenance operator, no fatal error such as a disappearance of the confidential data is caused (Refer to Step S11 in FIG. 2 and so on). Accordingly, there can be avoided an inconvenient state (a situation being inefficient time-wise and economically) in which the card reader 1 must be restored to an environment where the security is ensured. As a result, time-wise and economical efficiency can be improved (improvement of operability) in maintenance and tuning work as well as production work.

In the present embodiment, the confidential data saved in the RAM 11 is copied to the RAM 12 at the time when the card reader 1 receives the command from the higher-level device 2 for activating the removal detection function of the switching circuit 15 (Refer to Step S1 in FIG. 2). Therefore, a time period for redundantly saving the confidential data can be shortened so that security can be enhanced accordingly. Furthermore, used as memory devices for saving the confidential data are the volatile memory devices (RAM 11 and RAM 12) in which the confidential data is automatically deleted when the power supply from the main power source and the secondary power supply is shut off, so that security can still be enhanced.

Moreover, as Step S9 and Step S13 show in FIG. 2, a response in relation with the result of Step S6 is sent to the higher-level device 2, and then the higher-level device 2 can take quick actions for subsequent operations.

INDUSTRIAL APPLICABILITY

The method for detecting an improper removal of electronic equipment according to the present invention is useful for improving operability in maintenance and tuning work for the electronic equipment.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Electrical equipment
10 CPU
11 RAM (as a first memory)
12 RAM (as a second memory)
13 Power supply control IC
14 Secondary power supply
15 Switching circuit
16 Removal detection switch

What is claimed is:
1. A method for detecting an improper removal of electronic equipment, which receives a command from a higher-level device and executes a processing operation according to the command; the method comprising:
   using a first memory of the electronic equipment to save electronic information including confidential data;
   using a detection means of the electronic equipment to detect an improper removal of the electronic equipment;
   using a power supply control means of the electronic equipment to shut off a power supply to the first memory according to a signal from the detection means; and
   wherein the electronic equipment includes a second memory that is separate from and independent of the first memory;

wherein data saved in the second memory is not deleted even when the power supply control means shuts off the power supply; and wherein the detection means is activated after the confidential data saved in the first memory is copied to the second memory.

2. The method for detecting an improper removal of electronic equipment according to claim 1;

wherein the confidential data saved in the first memory is copied to the second memory at a time when the electronic equipment receives a command for activating a detection function of the detection means from the higher-level device.

3. The method for detecting an improper removal of electronic equipment according to claim 1;

wherein at least one of the first memory and the second memory is a volatile memory device.

4. The method for detecting an improper removal of electronic equipment according to claim 1, further comprising:

a step of judging whether the confidential data saved in the first memory remains complete or not, after the detection means is activated; and a step of operating, according to a result of the judging, in which the detection means is deactivated if the confidential data saved in the first memory does not remain complete, and in which the confidential data saved in the second memory is deleted if the confidential data saved in the first memory remains complete.

5. The method for detecting an improper removal of electronic equipment according to claim 4;

wherein, after the operating step is executed, a response in relation to the operating step is sent to the higher-level device from the electronic equipment.

6. An electronic device which receives a command from a higher-level device and executes a processing operation according to the command, and which is configured to detect when the electronic device is improperly removed, the electronic device comprising:

a first memory configured to save electronic information including confidential data;

a detection means configured to detect an improper removal of the electronic device;

a power supply control means configured to shut off a power supply to the first memory according to a signal from the detection means; and a second memory that is separate from and independent of the first memory;

wherein data saved in the second memory is not deleted even when the power supply control means shuts off the power supply; and wherein the detection means is activated after the confidential data saved in the first memory is copied to the second memory.

7. The electronic device according to claim 6;

wherein the confidential data saved in the first memory is copied to the second memory at the time when the electronic device receives a command for activating a detection function of the detection means from the higher-level device.

8. The electronic device according to claim 6;

wherein at least one of the first memory and the second memory is a volatile memory device.

* * * * *